(12) United States Patent
Takeuchi et al.

(10) Patent No.: US 9,114,762 B2
(45) Date of Patent: *Aug. 25, 2015

(54) WATERPROOF BOX

(75) Inventors: Kunihiko Takeuchi, Kakegawa (JP);
Hiroaki Yamada, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 13/376,938

(22) PCT Filed: Jun. 8, 2010

(86) PCT No.: PCT/JP2010/059703
§ 371 (c)(1),
(2), (4) Date: Dec. 8, 2011

(87) PCT Pub. No.: WO2010/143632
PCT Pub. Date: Dec. 16, 2010

(65) Prior Publication Data
US 2012/0097693 A1 Apr. 26, 2012

(30) Foreign Application Priority Data
Jun. 11, 2009 (JP) ................................. 2009-140263

(51) Int. Cl.
B65D 53/00 (2006.01)
B60R 16/023 (2006.01)
H02G 3/08 (2006.01)

(52) U.S. Cl.
CPC ............ B60R 16/0239 (2013.01); H02G 3/088 (2013.01)

(58) Field of Classification Search
CPC .......... H02G 3/08; H02G 3/14; B60R 16/0239
USPC .................................... 220/849, 810; 361/641
See application file for complete search history.

(56) References Cited

U.S. PATENT DOCUMENTS 6,953,126 B2 * 10/2005 Parker et al. ................. 220/4.22
2010/0307814 A1 * 12/2010 Aoki et al. ..................... 174/520

FOREIGN PATENT DOCUMENTS

| EP | 2 234 231 A1 | 9/2010 |
| JP | 5-9121 | 2/1993 |
| JP | 09-216648 A | 8/1997 |
| JP | 2000-004521 A | 1/2000 |
| JP | 2001-072116 A | 3/2001 |
| JP | 2001-314018 A | 11/2001 |
| WO | WO-2009/069271 A1 | 6/2009 |

OTHER PUBLICATIONS

International Search Report dated Sep. 7, 2010, issued for PCT/JP2010/059703.
European Search Report issued Oct. 4, 2013 in connection with European Application No. 10786163.

* cited by examiner

*Primary Examiner* — Anthony Stashick
*Assistant Examiner* — Raven Collins
(74) *Attorney, Agent, or Firm* — Locke Lord LLP; James E. Armstrong, IV; Brian S. Matross

(57) ABSTRACT

An object of the present invention is to provide a waterproof box capable of improving waterproof performance, and workability and space-saving. The washing water hits the lower face of the first waterproof part in the upper cover, and the upper cover is uplifted, at this time the tapered outer face and the inner face in the first waterproof part and are abutted and engaged to each other, causing the inlet of the small passage to close. Even if water infiltrates, the water infiltrates into the dead end to let the momentum thereof reduce. Further, the water infiltrates into the dead end let the momentum thereof reduce. The water its momentum have been reduced falls. Consequently, it is effective for enhancing waterproof performance to include the dead end.

12 Claims, 14 Drawing Sheets

WATERPROOF BOX

CROSS REFERENCE TO RELATED APPLICATIONS

This application is related to three co-pending applications, all entitled, "WATERPROOF BOX" filed concurrently herewith, in the names of Kunihiko TAKEUCHI and Hiroaki YAMADA as a national stage application of International Application No. PCT/JP2010/059702, filed Jun. 8, 2010; in the names of Sunsoku I and Yasuhito SUZUKI as a national stage application of International Application No. PCT/JP2010/059750, filed Jun. 9, 2010; and in the names of Kouki SATOH and Noriaki AKAMINE as a national stage application of International Application No. PCT/JP2010/059751, filed Jun. 9, 2010; which co-pending applications are assigned to the assignee of the instant application and also incorporated by reference herein.

TECHNICAL FIELD

This invention relates to a waterproof box for waterproofing by overlaying a cover waterproof structure on a box main body waterproof structure.

BACKGROUND ART

An electric junction box installed in, e.g., an engine compartment of an automobile is provided with a connection processing component for a wire harness, an electric part of such a relay or fuse, or an electric component of such an electric control unit, which is therefore required to be kept away from water when traveling in the rain or washing the engine compartment with high-pressure. This requires the electric junction box to be configured waterproofed by letting the box main body accommodating such the above electric parts and a cover covering an upper opening of the box main body each have waterproof structures. The electric junction box thus serves as a waterproof box.

For a waterproof box, there are well-known a type of waterproof by filling a packing between a waterproof structure provided in the box main body and a waterproof structure provided in the cover (e.g., see PTL 1), and a type of waterproof by overlaying a waterproof structure of the cover on a waterproof structure of the box main body without a packing (e.g., see PTL 2).

With the type of waterproof using a packing, the packing between the waterproof structures is adapted to fill a clearance, which thus improves waterproof performance but poses a drawback of increase of parts count and cost incurred by the packing. Further, there is a drawback of not avoiding additional man-hour for filling of the packing. This has recently prompted a packing-less type waterproof.

With the packing-less-type waterproof, what is disclosed in the below PTL 2 is configured to be provided with a box main body with an upper opening and a cover covering the upper opening of the box main body. The waterproof box is designed to waterproof by overlaying waterproof structures to each other disposed at a seam portion of the box main body and the cover. Specifically, the waterproof structure of the box main body has a waterproof annular convex circumferentially arranged at a tip position of a side wall of the box main body, and that of the cover has a waterproof annular concave circumferentially arranged at a tip position of a side wall of the cover.

In the above-mentioned configuration and structure, the cover is arranged above the opening of the box main body, is then straightforwardly moved, and the waterproof structures are overlaid to each other, which thus makes the waterproof concave engage the waterproof convex. The box main body and the cover are also locked in a main body lock provided with the waterproof structure of the box main body by virtue of a U-shaped cover lock provided with the waterproof structure of the cover being latched, resulting in a locking state. The main body lock and the cover lock are arranged at least two positions of the sides (or back and forth) of the waterproof. The two positions are arranged separated from each other.

PRIOR ART DOCUMENT

Patent Literature

PTL 1: Japanese Patent Application Laid-Open Publication No. 2001-72,116
PTL 2: Japanese Patent Application Laid-Open Publication No. H9-216,648

DISCLOSURE OF THE INVENTION

Problem to be solved by the invention

However, with the packing-less-type waterproof box, there is such a drawback as follows. Namely, when waterjet pressure of high-pressure washing is high, washing water injecting toward the waterproof box hits a side wall of the box main body, then ascends along the side wall, and passes through a small clearance between the waterproof structures overlaid to each other, which cause a drawback of water infiltrating into inside.

It should be noted that, with the PTL 2, because an inner wall is circumferentially arranged inner than each waterproof structure of a side wall and a cover side wall, when water infiltrates into in case of above-mentioned state, the inner wall is adapted to prevent such electric components from being splashed with water. There are, however, such cases in various known waterproof boxes that the inner wall is not allowed to be provided (occasionally, the inner wall is not allowed to be partially provided), it can thus be said that it requires effective countermeasure for each of waterproof structures for box main body and the cover.

Recently, aluminum electric wires may be pulled in into the waterproof box. The aluminum electric wire offers its dislike of adhere of water, enhancing requirement for prevention of adhere of water.

Also, with the packing-less-type waterproof box, there is such a drawback as follows. Namely, when a locking state of the main body lock and the cover lock is intended to be released, it is required to each unlock at least two locks located, which is a drawback of complicated work for the operator or the user. Further, removal of the cover while each unlocking the two of locks has a drawback of necessity for large space above the waterproof enough to use both hands. It should be noted that solution for these drawbacks is necessarily required to maintain waterproof performance.

The present invention is attained in view of the above drawbacks, and an object of the resent invention is to provide a waterproof box capable of improving waterproof performance. An object of the resent invention is also to provide a waterproof box capable of improving workability and space-saving.

Means for Solving the Problem

There is provided a waterproof box of the invention described in claim 1 for resolving the above-mentioned problem, characterized by comprising: a box main body having a side wall and accommodating a component in the side wall which offers its dislike of water; a cover having a cover side wall and covering an opening defined by a side wall edge of the box main body; a main body waterproof structure disposed at the side wall edge; a cover waterproof structure disposed at an edge of the cover side wall, the cover waterproof structure securing waterproof by overlaying the main body waterproof structure thereon; pivot points for making the cover rotative and detachable relative to the box main body disposed in the main body waterproof structure and the cover waterproof structure, respectively; and a dead end disposed on a wall in which the pivot point of the cover side wall exists, wherein the dead end is disposed on a main body mating face of the main body waterproof structure and a cover mating face of the cover waterproof structure which both the mating faces oppose to each other by the overlaying, and at an outlet of a small passage induced by a clearance between the main body mating face and the cover mating face, and is formed into a space with a desired size.

According to the present invention having such a feature, the cover is made rotative about the pivot point. The cover can cover an opening of the box main body, and be replaced by rotating thereof. In the box main body and the cover, a locking structure to lock these can be just disposed at an opposite side of the pivot point. Namely, unlocking can be done by operating just one point. According to the invention, replacing of the cover can be done with one action by one hand.

Furthermore, according to the invention, since the small passage induced by the clearance between the main body mating face and the cover mating face, in other words, may become a small passage through which water passes, it is made possible that by providing the small passage at the outlet of the small passage, especially with a high water pressure the dead end serves as buffering. Even if the water can pass through the outlet of the small passage, its momentum is reduced enough not to splash water to such electric parts accommodated in the box main body. It is should be noted that the water passing through the outlet of the small passage falls to be discharged outside via a drain outlet disposed below the box main body or a drain outlet of the under cover attached to under the box main body.

The waterproof box of the invention described in claim 2, is characterized by, in the waterproof box described in claim 1, further comprising an inner wall disposed inner than the side wall of the box main body, wherein a tip of the inner wall is disposed to project nearer a base end of the cover side wall than the outlet of the small passage provided with the dead end.

According to the invention having such a feature, the inner wall exists inner than the outlet of the small passage. The inner wall doubly prevents splashing of water against such electric parts (offering dislike of water) accommodated in the box main body.

The waterproof box of the invention described in claim 3 is characterized by that, in the waterproof box described in claim 2, the inner wall is formed integral with a cavity of the component accommodated in the box main body.

According to the invention having such a feature, the inner wall is formed integral with the cavity for attaching a component accommodated in box main body. The inner wall that is formed integral with the cavity can be arranged further away from the pivot point than the one that is formed integral with the side wall of the box main body or the cover side wall of the cover, which may not disturb rotation of the cover even if ensuring necessary and sufficient height of inner wall.

The waterproof box of the invention described in claims 4 to 6 is characterized by that, in the waterproof box described in any one of claims 1 to 3, the dead end is provided with a convex portion projecting so as to correspond to the inlet of the small passage toward an outer face of the dead end from an inner face of the dead end.

According to the invention having such a feature, water after its momentum is reduced by the dead end is led in a direction away from the outlet of the small passage by the convex. Namely, the water is made exiting from the outlet of the small passage unlikely.

The waterproof box of the invention described in claim 7 is characterized by that, in the waterproof box described in any one of claims 1 to 6, reference to an outlet of the dead end of the outlet of the small passage is either set on the same plane along a extending direction of the side wall as reference to an outlet of the box main body, or set outside the box main body further than reference to the outlet of the box main body.

According to the invention having such a feature, water after its momentum is reduced by the dead end is made exiting from the outlet of the small passage unlikely.

Effects of the Invention

According to the invention described in claim 1, it is successfully made effective to detach the cover with one action by one hand by providing a pivot point. According to the invention, it is therefore successfully made effective to improve workability further than conventional one. It is also successfully made effective to improve space-saving by virtue of one action by one hand, unnecessity to secure large space above the cover for space of operator's both hands.

According to the invention described in claim 1, it is successfully made effective to reduce momentum of ascending water through the small passage by providing a dead end at an outlet of the small passage. According to the invention, it is therefore successfully made effective to prevent splash of water against component accommodated in the box main body that offers its dislike of water. It is also successfully made effective to improve waterproof performance further than conventional one.

According to the invention described in claim 2, it is successfully made effective to increase structures for prevention of splash of water so as to improve reliability.

According to the invention described in claim 3, it is successfully made effective to enable the cover to rotatively move about the pivot point and secure necessary and sufficient inner wall height.

According to the invention described in claims 4 through 6, it is successfully made effective to make water exiting through the small passage unlikely by providing a convex at the dead end.

According to the invention described in claim 7, it is successfully made effective to make water exiting through the small passage unlikely by setting the outlet reference.

DESCRIPTION OF EMBODIMENTS

Figure 1:
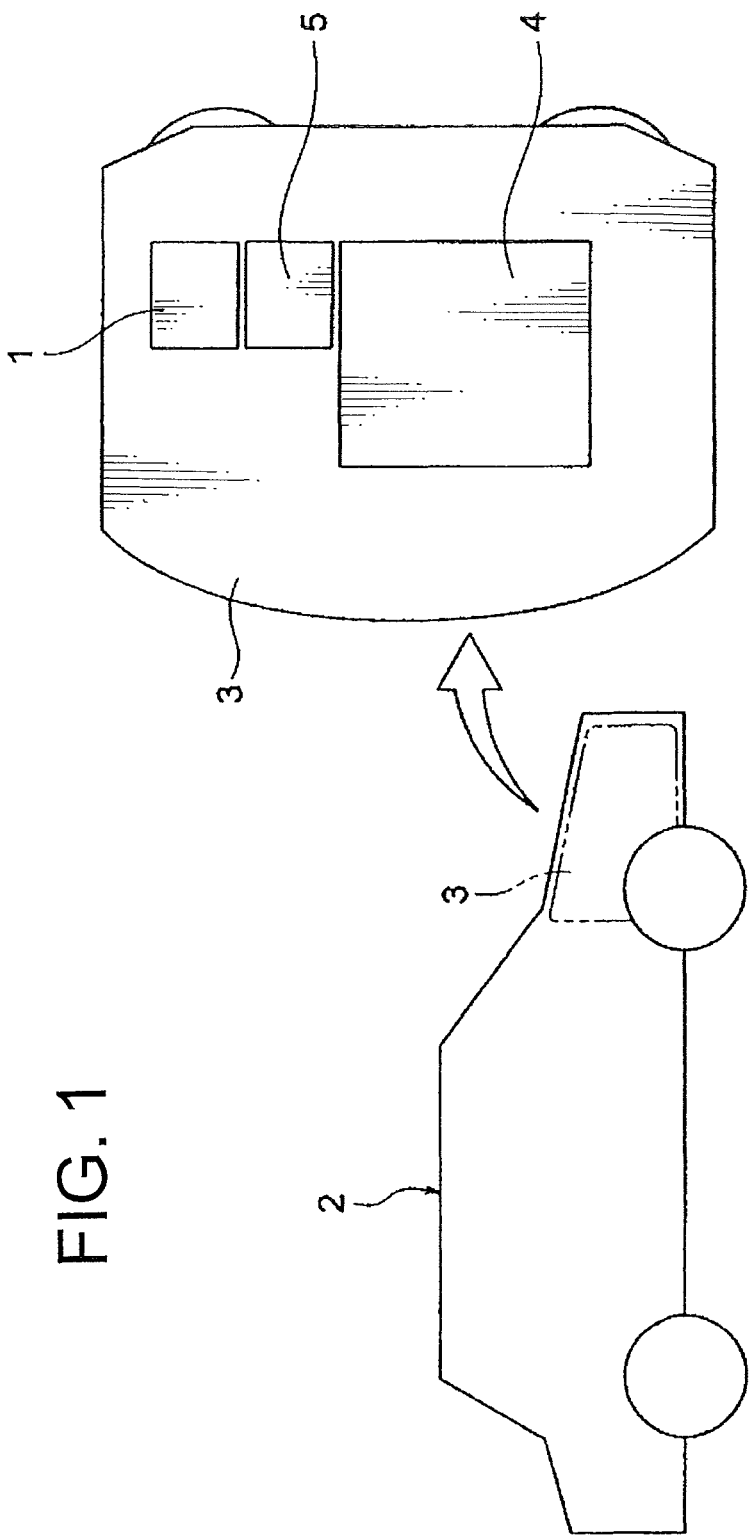
FIG. 1 is a schematic view illustrating example of installation of an electric junction box including a waterproof box according to the present invention.

In FIG. 1, reference symbol 1 indicates an electric junction box (R/B: a relay box, J/B: a device including electric components for a vehicle such as a junction box and ECU). The electric junction box is a relay box, but not intended to limit thereto, which is installed in an engine compartment 3 of an automobile 2. In the engine compartment 3 a battery 5 is installed adjacent the engine 4. Adjacent the battery 5 the electric junction box 1 is installed. The electric junction box is installed in the engine compartment 3, which thus requires for electric components inside (components of dislike of water) not to be splashed with water when traveling in the rain or high-pressure washing of the engine compartment 3.

The electric junction box 1 to be mentioned below has a waterproof box according to the present invention, which may be designed not to splash the inside electric components with water even when water pressure of high-pressure washing injection is such a high pressure as 8 MPa to 12 MPa.

Figure 2:
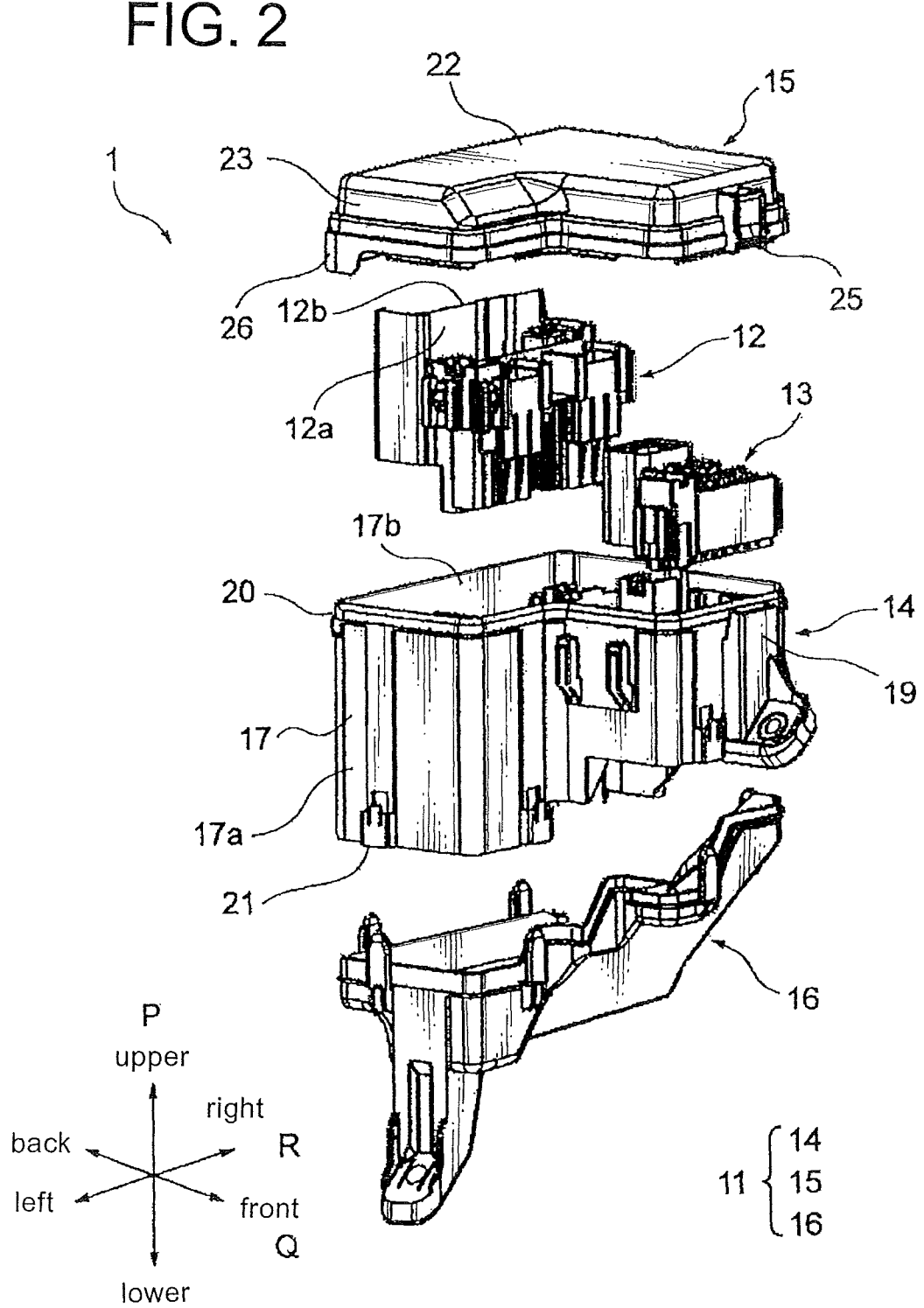
FIG. 2 is an exploded perspective view illustrating the electric junction box.

In FIG. 2, the electric junction box 1 is composed of a synthetic-resin-made waterproof box 11, and functional components 12, 13 accommodated in the waterproof box 11. A not-shown wire harness including, e.g., an aluminum electric wire is designed to be pulled in into the waterproof box 11. The functional components 12, 13 include a component including such a relay (illustration of a component such a relay is intentionally abbreviated, and FIG. 2 mainly illustrate a cavity). The cavity for the functional components 12 is provided with a side wall 12a.

The waterproof box 11 is composed of a box main body 14 accommodating the functional components 12,13, an upper cover 15 covering an upper opening of the box main body 14 (corresponding to a cover recited in the scope of claim), a lower cover 16 engaging with a lower part of the box main body 14.

The present invention has some features associated with the box main body 14 and the upper cover 15. One of features is to include a waterproof structure capable of exhibiting high waterproof performance in spite of packing-less. Another feature is to include a structure of the upper cover being rotative related to the box main body 14 and detachable with one action by one hand. Hereinafter, the box main body 14 and the upper cover 15 will be discussed in light of these features.

The box main body 14 has a side wall 17. The side wall 17 is formed into a frame shape. The side wall 17 is formed into such a shape as to be illustrated by continuing a plurality of walls. Herein defining an arrow P as vertical direction, an arrow Q longitudinal direction, an arrow R horizontal direction (it is not intended to define them, corresponding to longitudinal and horizontal direction of the engine compartment 3), a pivot point 18 (see FIG. 3) for rotatively and detachably moving the upper cover 15 is disposed outside the backward wall of the side wall 17. A main body lock 19 for locking the upper cover 15 is also disposed outside the frontward wall of the side wall 17.

The box main body 14 is designed to make the upper cover 15 rotative about the pivot point 18 while to lock the upper cover 15 by the main body lock 19. Unlocking of the above locking state and rotating in such a way as to lift the upper cover 15 allows the upper cover 15 to be replaced with ease.

A main body waterproof structure 20 as a part for waterproofing is circumferentially disposed on an upper end of the side wall 17. An engagement part 21 as a part for engaging the lower cover 16 is circumferentially disposed on a lower end of the side wall 17.

It should be noted that the engagement part 21 is designed to be applied to known structure, herein abbreviating explanation thereof.

The upper cover 15 is a cover part formed fitted to the box main body 14 in shape, having a ceiling wall 22 to be as a top part of the waterproof box 11, a cover side wall 23 downwardly extending from a side edge of the ceiling wall 22. Onto the backward wall of the cover side wall 23 is disposed a pivot point 18 (see FIG. 3) for the box main body 14 along with a pivot point 2 (see FIG. 3) to be a rotation center of the upper cover 15. Outside of the frontward wall of the cover side wall 23 is disposed a cover lock 25 to be locked by being latched to the main body lock 19 of the box main body 14. A cover waterproof structure 26 is circumferentially disposed on a lower end of the cover side wall 23a as apart for waterproofing.

It should be noted that the lower cover 16 is designed to be applied to known structure, abbreviating, herein, explanation thereof.

Figure 3:
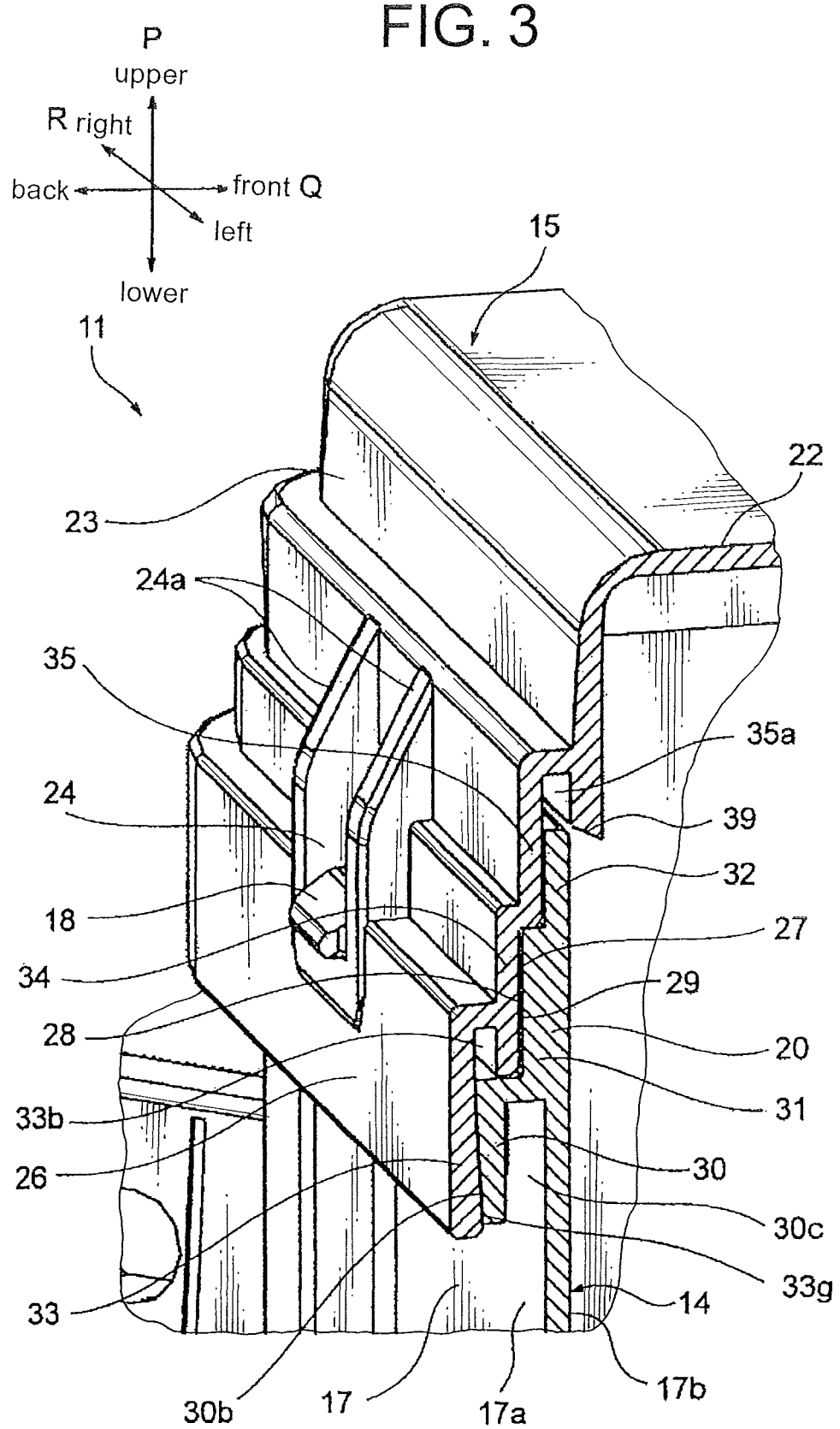
FIG. 3 is a perspective view illustrating a waterproof structure for main body and that for a cover (partially including cross-section)

The main body waterproof structure 20 and the cover waterproof structure 26 will be discussed in detail with reference to FIGS. 3 to 8. In FIGS. 3 and 5 a waterproof structure is shown for a wall in which the pivot points 18 and 24 exist as a typical example representing all side walls.

Figure 4:
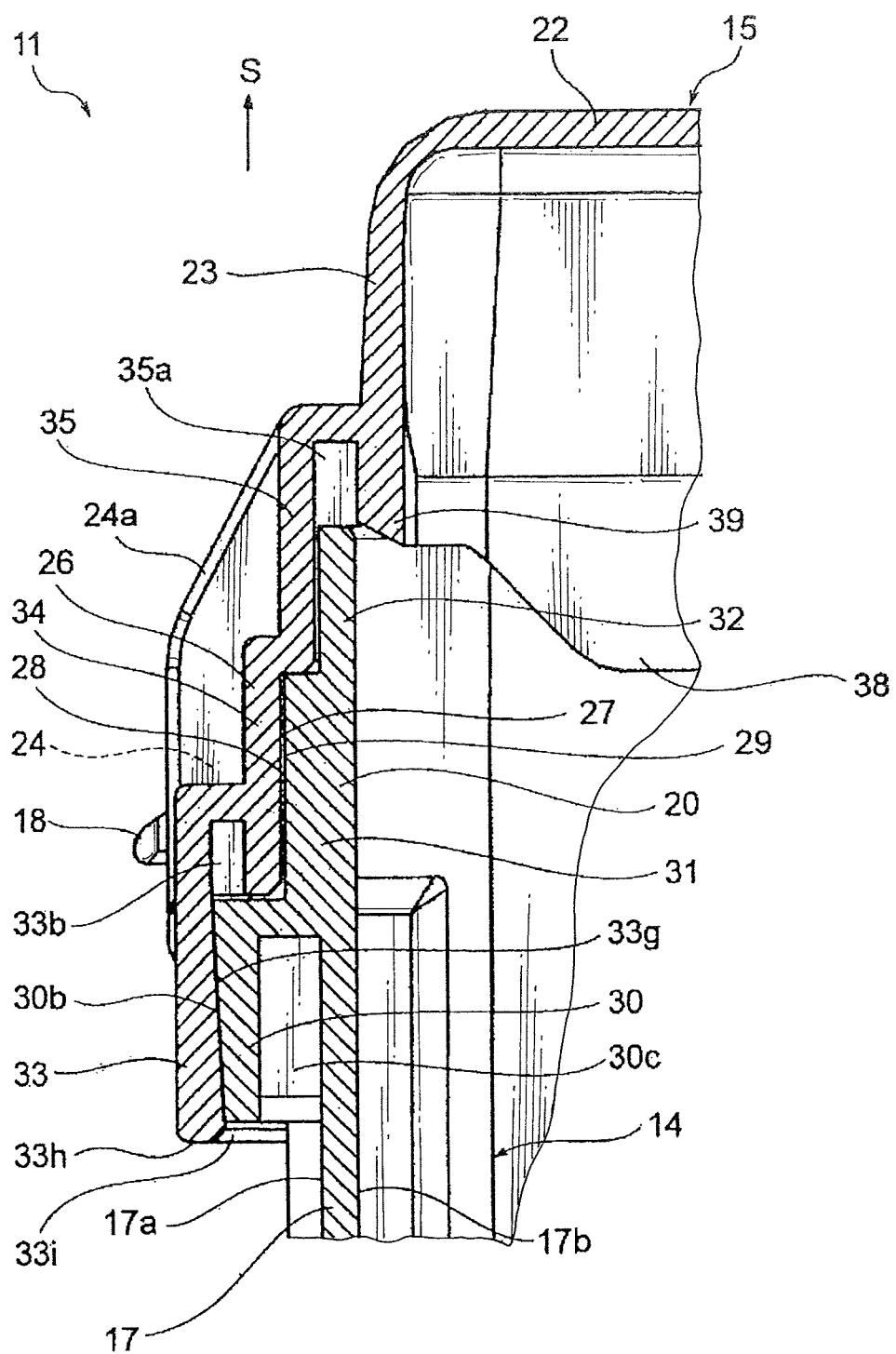
FIG. 4 is a cross-sectional view illustrating the waterproof structure for main body and that for the cover.
Figures 5A, 5B:
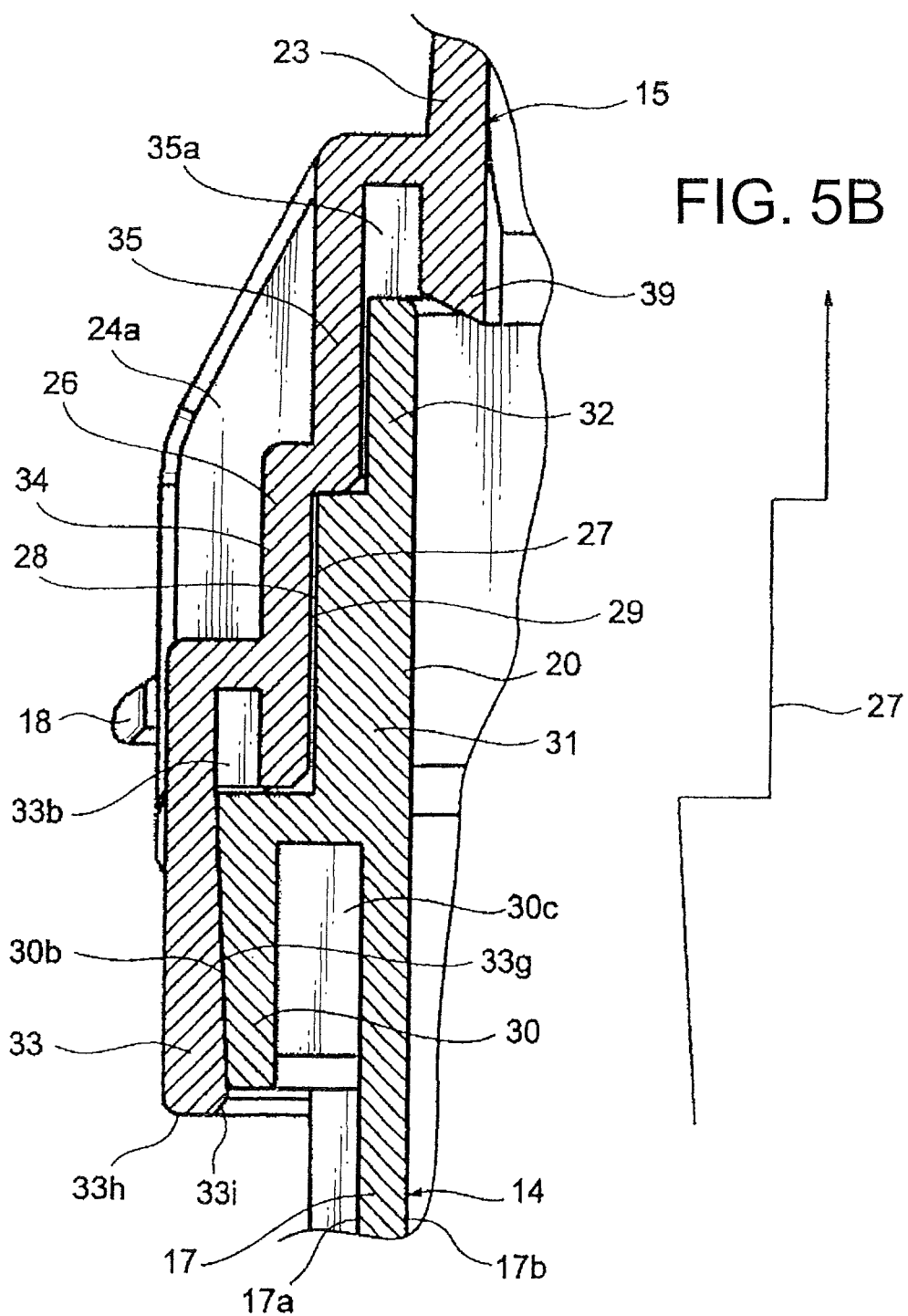
FIG. 5A is a cross-sectional view illustrating the waterproof structure for main body and that for the cover.
FIG. 5B is a schematic view illustrating the small passage.

Rotating the upper cover 15 relative into the box main body 14 to lock as shown in FIGS. 3 and 4 results in overlaying the cover waterproof structure 26 on the main body waterproof structure 20 as illustrated.

It is thus necessary to consider a structural rotation track for rotation of the upper cover 15, but not possible to overlay along all circumferences with no clearance. Accordingly, between the main body waterproof structure 20 and the cover waterproof structure 26 is induced a small passage 27 (the small passage 27 is typically shown in such a way as to indicate a direction of water infiltrating) by a clearance in these opposite faces (mating faces to be described below). It should be noted that prevention of infiltrating of water within the small passage 27, large reduction of momentum of infiltrating water or the like is what the waterproof structures of the waterproof box 11 should aim at.

The main body waterproof structure 20 is provided with a main body mating face 28. The cover mating face 29 is provided with a cover waterproof structure 26. The main body waterproof structure 28 and the cover mating face 29 are arranged to oppose to each other. Each face composing the main body mating face 28 and the cover mating face 29 will be described below.

The main body waterproof structure 20 in FIGS. 3 to 8 is a part disposed on the upper end of the side wall 17 and waterproofing as mentioned above, and has a first waterproof part 30 to be an inlet of the small passage 27 side, a second waterproof part 31 to be a middle of the small passage 27, and a third waterproof 32 to be an outlet of the small passage 27 side (in the small passage 27, a part that water will first infiltrate from outside is referred to as an inlet). Now there is described the third waterproof part 32 in order.

The third waterproof part 32 is located at an upper end of the side wall 17. The third waterproof part 32 is formed as thick as the side wall 17 (an outside 17*a* and an inside 17*b* defining the thickness of the side wall 17 are formed along the vertical direction mentioned above). The third waterproof part 32 has an upper face 32*a* corresponding to an upper face of the side wall 17. The upper face 32*a* is formed as a face partially composing the main body mating face 28. Also, an outer face 32*b* orthogonally connecting to the upper face 32*a* is formed as a face partially composing the main body mating face 28. The outer face 32*b* is formed parallel to the inner face 17*b* of the side wall 17. The upper face 32*a* has a small chamfered part 32*c* at a part connecting to the side wall 17.

The second waterproof part 31 is located below the third waterproof part 32. The second waterproof part 31 is formed about twice as thick as the third waterproof part 32 (herein, "about twice thickness" may be just one example). The second waterproof part 31 is formed to project outward by what is thicker than the third waterproof part 32. The upper face 31*a* of the second waterproof part 31 is formed to connect orthogonally to the outer face 32*b* of the third waterproof part 32. The upper face 31*a* is also formed parallel to the upper face 32*a* of the third waterproof part 32. The upper face 32*a* is formed as a face partially composing the main body mating face 28. The outer face 31*b* orthogonally connecting to the upper face 31*a* is formed loner than the outer face 32*b* of the third waterproof 32. The outer face 31*b* is formed parallel to the inner face 17*b* of the side wall 17. The outer face 31*b* is formed as a face partially composing the main body mating face 28. The projection-shaped pivot point 18 projecting outward is disposed at a predetermined position of the outer face 31*b*.

The first waterproof part 30 is located below the second waterproof part 31. The first waterproof part 30 is formed to project outward further than the second waterproof part 31. An upper face 30*a* of the first waterproof part 30 is formed to connect orthogonally to the outer face 31*b* of the second waterproof part 31. The outer face 30*a* is formed parallel to the upper face 31*a* of the second waterproof part 31. The upper face 30*a* is formed longer than the upper face 31*a* of the second waterproof part 31. The upper face 30*a* is formed as a face partially composing the main body mating face 28. The outer face 30*b* connecting to the upper face 30*a* is formed not parallel to the inner face 17*b* of the side wall 17 but inclined thereto. Specifically, the outer face 30*b* is formed into a tapered face approaching the inner face 17*b* as traveling downward. A dead end 30*c* connecting to the outer face 17*a* is formed between the outer face 30*b* to be a tapered face and the outer face 17*a* of the side wall 17.

The dead end 30*c* is formed such that a lower side is open, and an upper side dead end, as well as formed a space with desired size. The dead end 30*c* has a inner face 30*d* corresponding to the outer face 17*a* of the side wall 17, an outer face 30*e* parallel to the inner face 30*d*, and a back face 30*f* parallel to the upper face 30*a*. The dead end 30*c* is formed such that the space becomes larger than other dead ends 35*a*, 33*b* to be mentioned below (it is formed such that washing water may infiltrate further).

Viewing the main body waterproof part 20 in cross-section, from the upper face 32*a* of the third waterproof part 32 to the outside tapered face 30*b* of the first waterproof part 30, the main body meting face 28 is formed into a terraced shape, in other wards, a labyrinthian shape. Namely, the main body mating face 28 is formed such a shape as to make infiltrating of water unlikely.

Meanwhile, the cover waterproof structure 26 is as mentioned above a part disposed on an lower end of the side wall 23 to be adapted to waterproof, and has a first waterproof part 33 to be the inlet of the small passage 27 side, a second waterproof part 34 to be a middle of the small passage 27, and a third waterproof 35 to be an outlet of the small passage 27 side so as to be formed to be such a nearly skirt-shaped wall as to open outward. The first waterproof part 33 is located to correspond to the first waterproof part 30 of the main body waterproof structure 20. The second waterproof part 34 is also located to correspond to the first waterproof part 31 of the main body waterproof structure 20. The third waterproof part 35 is located to correspond to the third waterproof part 32 of the main body waterproof structure 20. There will be described the third waterproof part 35 consequently.

53 The third waterproof part 35 has a dead end 35*a* that opens at a face opposite to the upper face 32*a* of the third waterproof part 32 in the main body waterproof structure 20 (a face capable of composing the cover mating face). The dead end 35*a* is arranged such as a lower side being open and an upper side being dead end, and is formed into a space with desired size. The dead end 35*a* has an inner face 35*b*, an outer face 35*c* parallel to the inner face 35*b*, and a back face 35*d* connecting to the inner face 35*b* and the outer face 35*c*. The inner face 35*b* is located right above the inner face 17*b* of the side wall 17 in the main body waterproof structure 14. The dead end 35*a* is formed such as to position the inner face 35*b* on a lower end of the side cover wall 23.

As to arrangement of the dead end 35*a* and position of the small passage 27, when an intersection position of an opening of the dead end 35*a* and the inner face 35*b* is set as an outlet reference 36, and an intersection position of the inner face 17*b* of the side wall 17 and the upper face 32*a* of the third waterproof part 32 is set as an outlet reference 37, these outlet references 36, 37 are set to exist on the same plane. Namely, the outlet references 36 and 37 are set so as to lessen the outlet of the small passage 27 as much as possible to make outflow of water from the outlet unlikely (the more the outlet reference 36 is positioned approach inside the box than the outlet reference 37, the more a width of the outlet become large to make outflow of water from the outlet of the small passage 27 likely)

Figure 9:
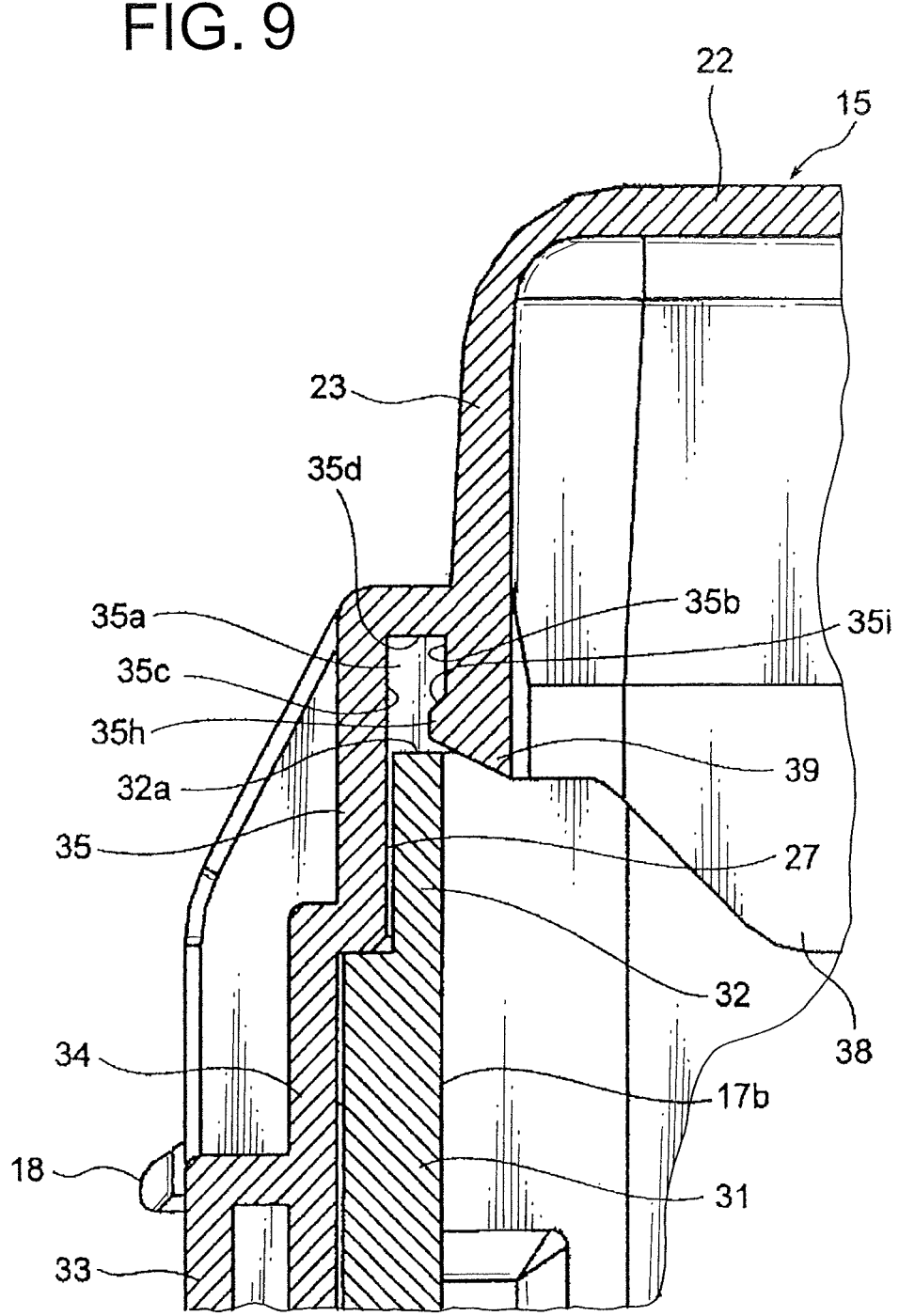
FIG. 9 is a cross-sectional view illustrating a first modification of a dead end.
Figure 10:
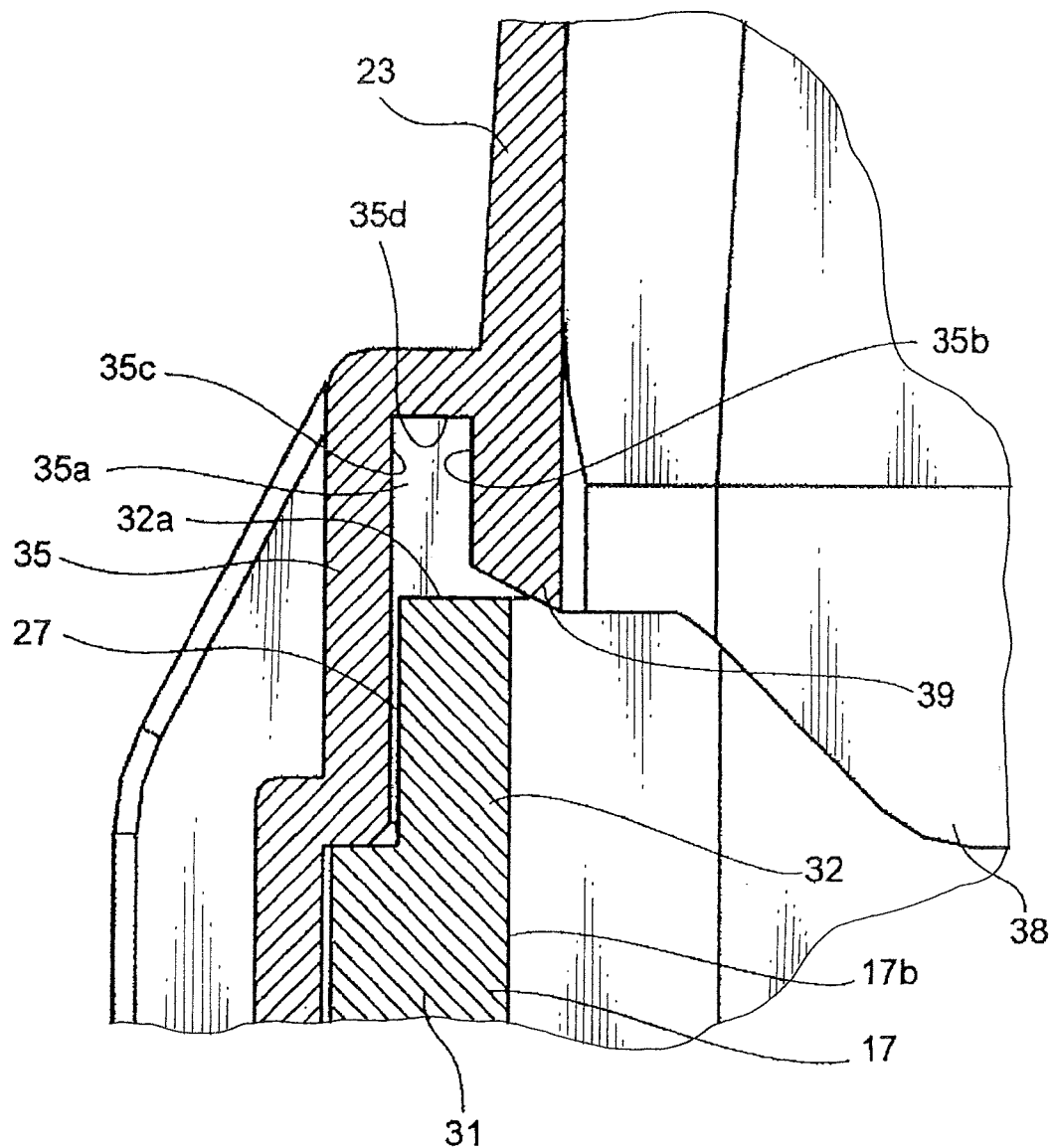
FIG. 10 is a cross-sectional view illustrating a second modification of the dead end.

It should be noted that as other example for the dead end 35a such a type as shown FIGS. 9 and 10 is exemplified as one example.

In the dead end 35a, in FIG. 9, a convex 35h is formed to project. The convex 35h is formed to project toward the outer face 35c from the inner face 35b. The convex 35h is located to correspond to the outlet of the small passage 27. Such the convex 35h upwardly has a tapered face 35i. Momentum of water infiltrating into the dead end 35a is reduced by the space with predetermined size or by hit against the back face 35d, and water when falling is guided to leave the outlet of the small passage 27 by the tapered face 35i of the convex 35h.

Figure 6:
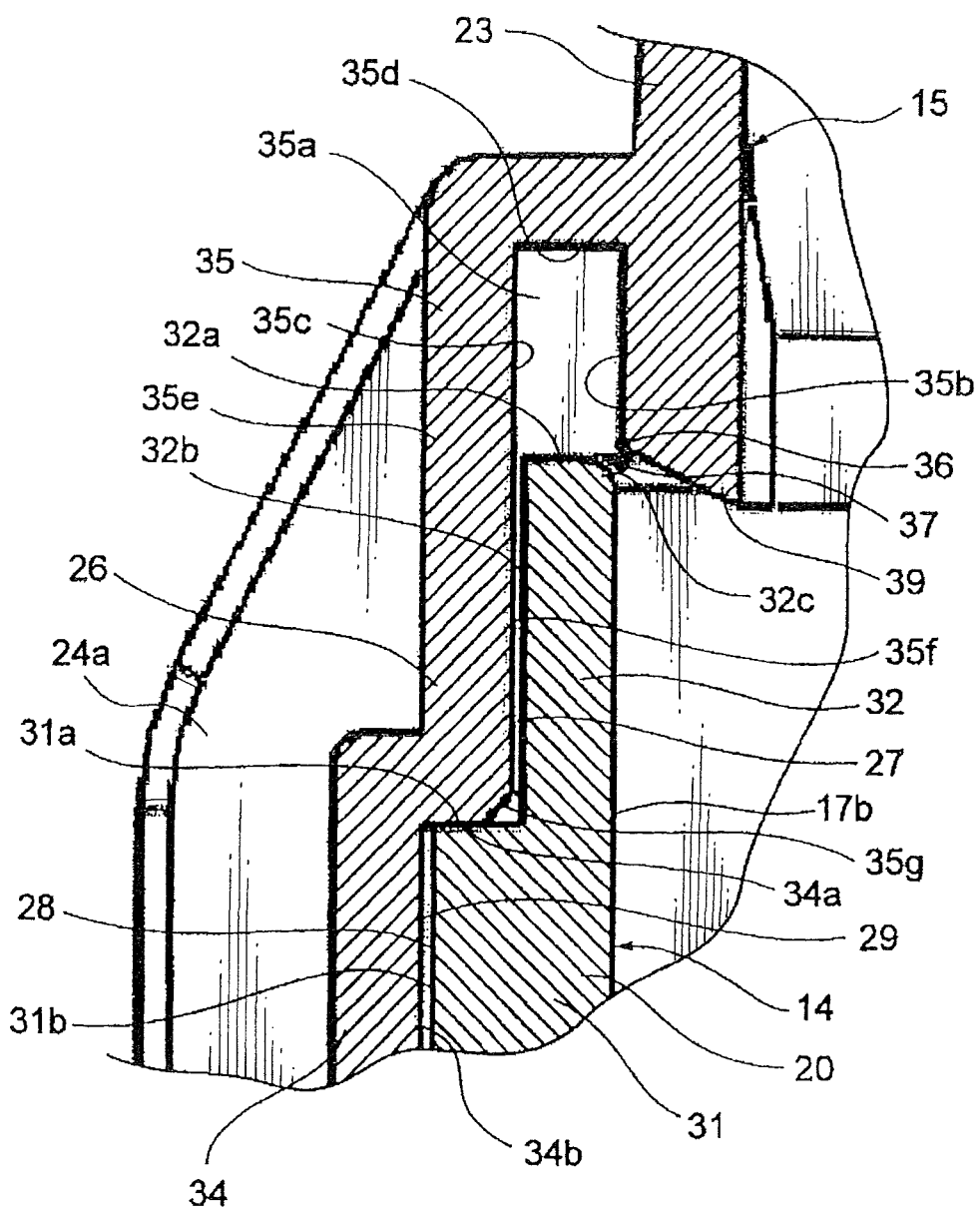
FIG. 6 is an enlarged cross-sectional view illustrating a third waterproof part.
Figure 7:
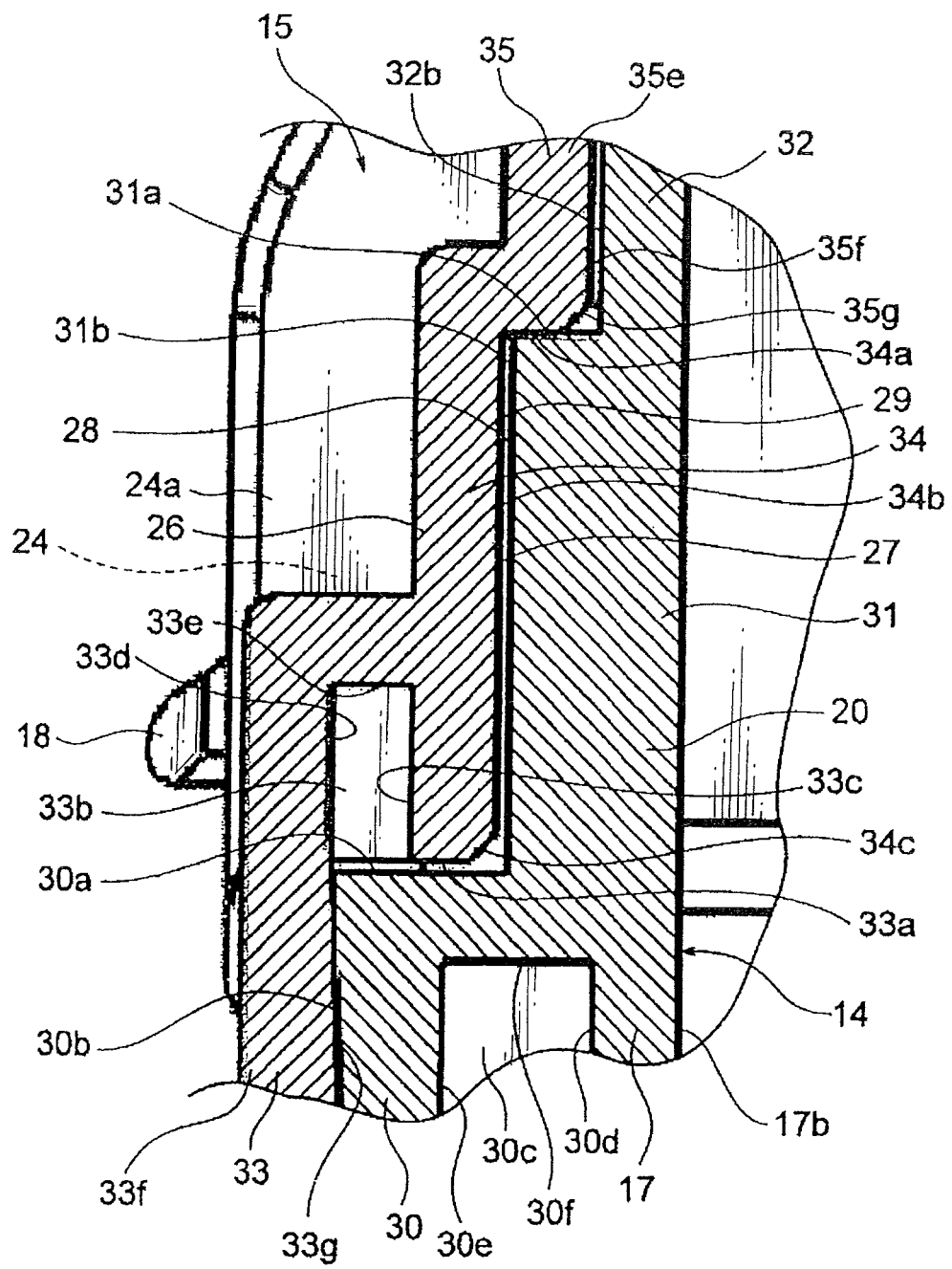
FIG. 7 is an enlarged cross-sectional view illustrating a second waterproof part.
Figure 8:
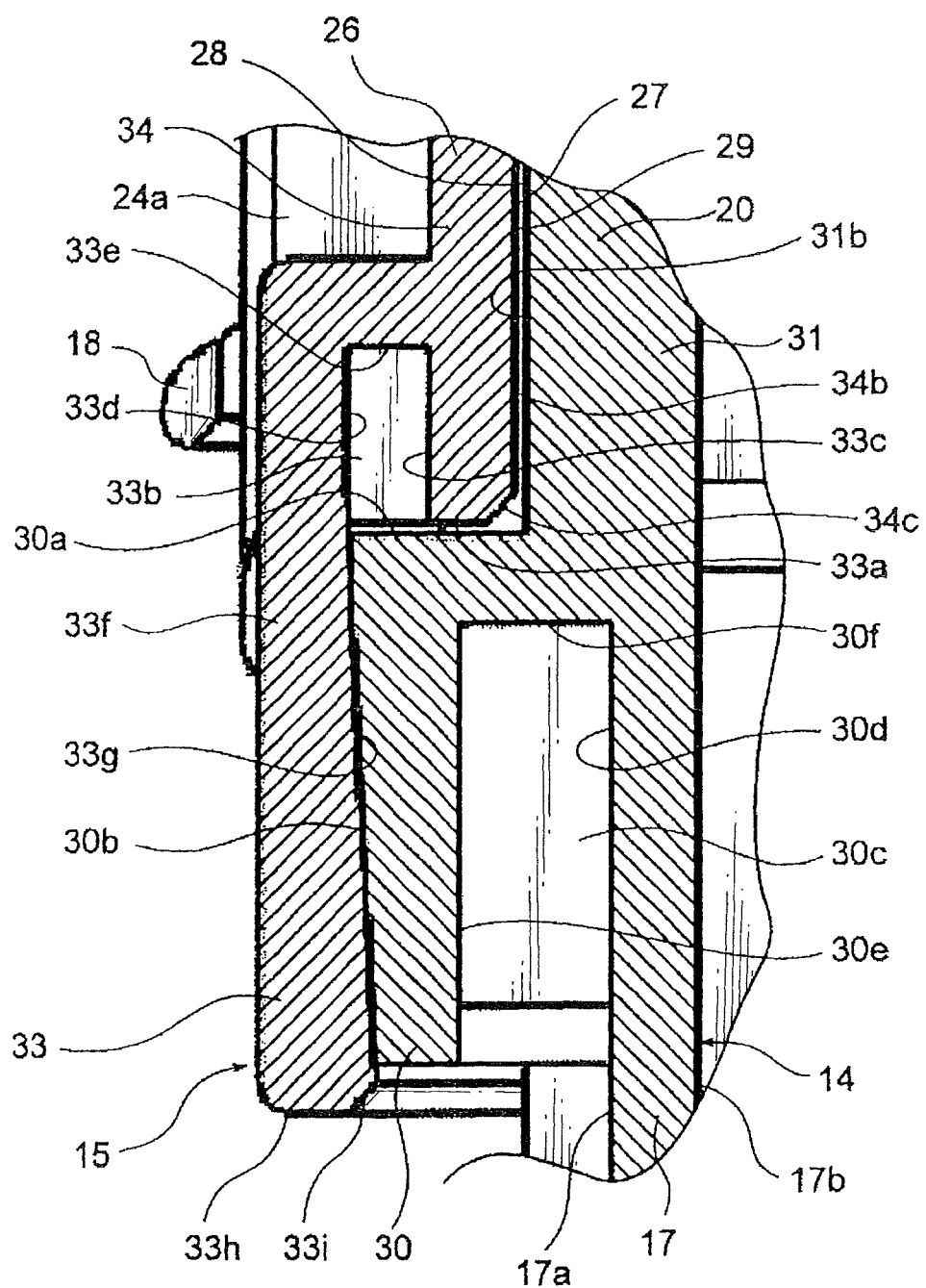
FIG. 8 is an enlarged cross-sectional view illustrating a first waterproof part.

In FIG. 10, the dead end 35a is formed such that the inner face 35b approaches the outer face 35c in comparison to FIGS. 5 and 6. The dead end 35c is formed to position a tapered part 39 mentioned below right above the inner face 17b of the side wall 17 by making the inner face 35b outside (the outlet reference 36 is formed to be positioned outer than the outlet reference 37). Momentum of water infiltrating into the dead end 35a is reduced by the space with predetermined size or hit against the back face 35d, and water then fall into a place away from the outlet of the small passage 27.

Again referring to FIGS. 3 to 8, the third waterproof part 35 has a wall-shaped part 35e connecting to the dead end 35a while straightly extending right downward. The wall-shaped part 35e has an inner face 35f opposite to the outer face 32b of the third waterproof part 32 in the main body waterproof structure 20. The inner face 35f is formed as a face partially composing the cover mating face 29. The inner face 35f has a small chamfered portion 35g at a part connecting to the second waterproof part 34 (the chamfered portion 35g is formed as a face partially composing the cover mating face 29).

The second waterproof part 34 is arranged below the third waterproof part 35. The second waterproof part 34 has a lower face 34a opposite to the upper face 31a of the second waterproof part 31 in the main body waterproof structure 20, and an inner face 34b opposite to the outer face 31b, and is formed as a wall-shaped part. The lower face 34a is arranged to connect to the chamfered portion 35g while an opposite side of the lower face 34a is arranged to connect to the inner face 34b. The inner face 34b is formed orthogonal to the lower face 34a and to extend right downwardly. Such inner face 34b has a small chamfered portion 34c at a part connecting to the first waterproofing part 33. The lower face 34a, the inner face 34b and the chamfered portion 34c are formed as a face partially composing the cover mating face 29.

The first waterproof part 33 is arranged under the second waterproof part 34. The first waterproof part 33 has a lower face 33b opposite to the upper face 30a of the first waterproof part 30 in the main body waterproof structure 20. The lower face 33a is provided with a dead end 33b opening at this position. The dead end 33b is formed so that a lower side thereof opens, and an upper side thereof dead-ends, and formed into a space with desired size. The dead end 33b has an inner face 33c, an outer face 33d parallel to the inner face 33c, and a back face 33e connecting to the inner face 33c and the outer face 33d. The inner face 33c is formed in a perpendicular direction of the upper face 30a in the first waterproof part 30.

The first waterproof part 33 has a wall-like part 33f extending right straightly downward while connecting to the dead end 33b. The wall-like part 33f has a tapered inner face 33g. The inner face 33g is formed so as to oppose the tapered outer face 30b of the first waterproof part 30 in the main body waterproof structure 20, and abut and engage the outer face 30b just when the upper cover 15 moves upward. The inner face 33g and each face upward are formed into such a face as to compose the cover mating face 29 partially.

The first waterproof part 33 has, in addition to the above, a lower face 33h to be a lowest end of the upper cover 15, and a chamfered part 33i connecting to the lower face 33h and the inner face 33g.

The pivot point 24 provided with the cover waterproof structure 26 a through bore (not shown) letting the projecting pivot point 18 in the main body waterproof structure 20 operatively receive, a pair of protect walls 24a arranged at opposite sides of the through bore. The pair of protect walls 24a is rib-shaped, and formed so as to extend vertically.

Again referring to FIG. 2, a cavity in the functional parts 12 is provided with an inner wall 12a. The inner wall 12a is formed so as to locate at a desired interval from the inner face 17b of the side wall 17 in the box main body 14. The inner face 12a is formed to project so that a tip 12b is located at a base end side of the cover side wall 23. The inner face 12a is formed to project so that a tip 12b is located upward the outlet 27 of the small passage 27. The inner wall 12a is, in addition to the main body waterproof structure 20 and the cover waterproof structure 26, formed such a part as not to splash such electric parts (parts offering dislike of water) with water.

To prevent water from splashing electric parts (parts offering dislike of water), although the main body waterproof structure 20 and the cover waterproof structure 26 are sufficient, it appears the inner wall 12a effectively enhance its reliability.

In FIG. 4 the upper cover 15 has an inner wall 38 extending so as to oppose the inner face 17b of the side wall 17 in the box main body 14. The inner wall 38 is disposed except a wall on which the pivot point 24 to be a rotation center of the upper cover 15 exists. This is why the upper cover 15 is rotative, the inner wall 38 is thus disposed except the above-mentioned wall in view of rotation track. On the wall the pivot point 24 exists, a tapered part 39 is disposed so that its tip is located below the outlet the small passage 27. The tapered part 39 slightly serves as inner wall.

In the above configure and structure, while having the upper cover 15 with one hand, inserting the pivot point 24 of the upper cover 15 into the pivot point 18, and rotating the upper cover 15 about the pivot points 18 and 24, the cover lock 25 of the upper cover 15 is hooked to the main body lock 19 of the box main body 14 to be locked (forming a lock state). When an upper opening of the box main body 14 is covered with the upper cover 15, the main body waterproof structure 20 and the cover waterproof structure 26 are overlaid, resulting in completion of such a waterproof structure form as shown in FIGS. 4 and 5. The main body waterproof structure 20 and the cover waterproof structure 26 let the main body mating face 28 and cover mating face 29 mate each other by aforementioned overlaying.

When high-pressure washing, washing water injecting toward the waterproof box 11 hits the outer face 17a of side wall 17 of the main box body 14, and then ascends along the side wall 17. The washing water having ascended along the side wall 17 infiltrates into the dead end 30a in the main body waterproof structure 20, by which the momentum thereof is reduced. The dead end 30c serves as buffering, by which momentum of the washing water is reduced to let the water fall.

Since the inlet of the small passage 27 is located away from the outer face 17a of the side wall 17 in the box main body 14, and the momentum of the washing water is almost reduced, a quantity of the washing water hitting the inlet of the small passage 27 becomes less, making infiltrating of water unlikely (it is difficult for washing water to infiltrate unless it hits the inlet of the small passage 27 with pinpoint accuracy).

The washing water hits the lower face 33h (the lowest end 33h of the upper cover 15) of the first waterproof part 33 in the upper cover 15, by which the upper cover 15 moves in the direction of the arrow S, namely the upper cover 15 is uplifted, at this time the tapered outer face 30b and the inner face 33g are abutted and engaged to each other, causing the inlet of the small passage 27 to close. This can limit infiltrating (passing through) of water.

Figure 11:
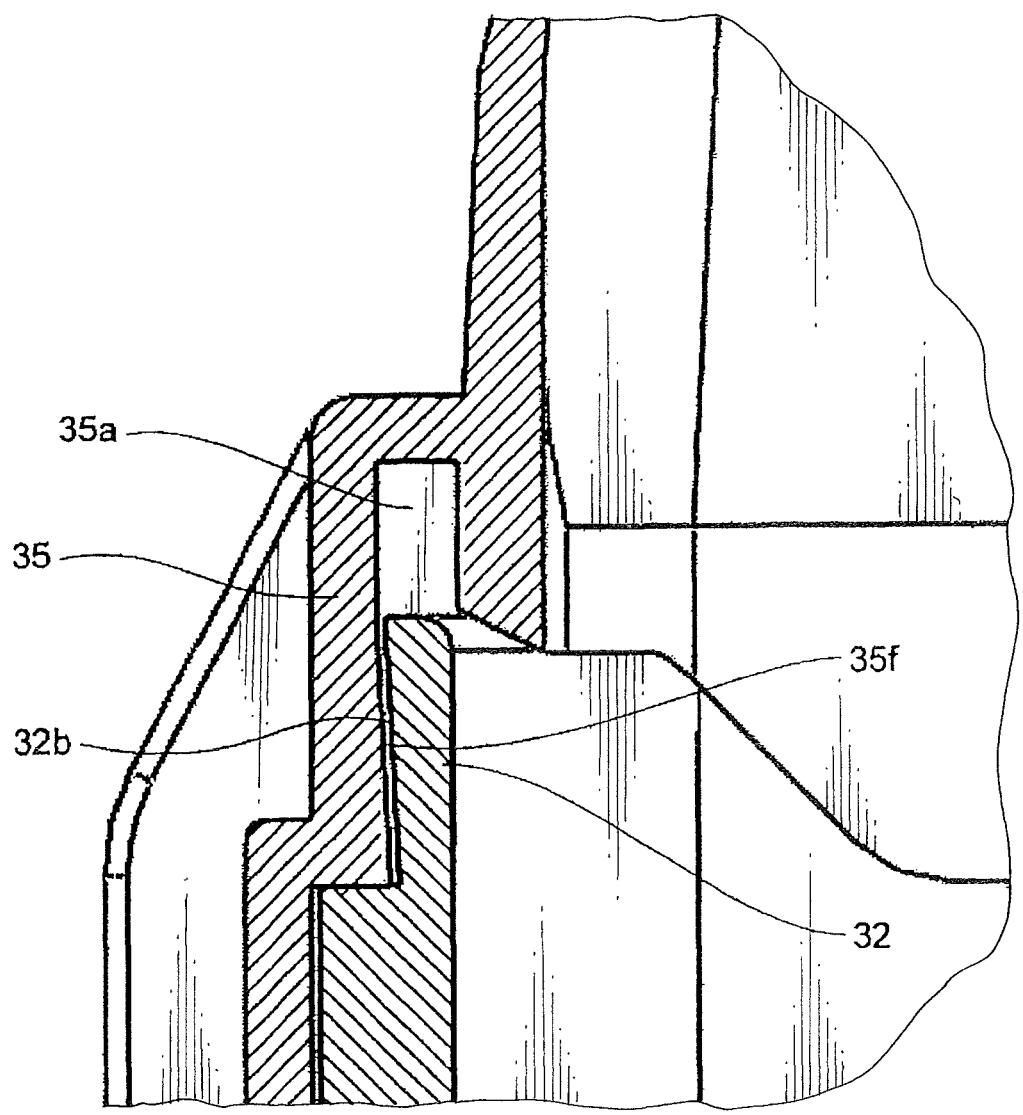
FIG. 11 is a cross-sectional view illustrating a modification in which a tapered face is provided with the third modification.

It should be noted that the outer face 31b and the inner face 34b of the second waterproof parts 31 and 34 may have the same function of the outer face 30b and the inner face 33g (the outer face 31b and the inner face 34b are, e.g., slightly tapered, which can effectively enhance limitation of infiltrating of water). Further, the outer face 32b and the inner face 35f of the third waterproof parts 32 and 35 may have the same function (see FIG. 11).

If water infiltrates before engagement of the tapered outer face 30b and the inner face 33g, because the water runs in an extending direction of the outer face 30b and the inner face 33g, the water infiltrates into the dead end 33b to let the momentum thereof reduce.

Furthermore, if water first infiltrates from the dead end 33b, because the small passage 27 is labyrinth-shaped with a plurality of steps (returns), which the labyrinth-shape limits infiltrating (passing through) of water.

If water infiltrates between the outer face 32b and the inner face 35f of the third waterproof parts 32 and 35, because the water runs in an extending direction of the outer face 32b and the inner face 35f, the water infiltrates into the dead end 35b to let momentum thereof reduce. The dead end 35a serves as buffering, by which momentum of the washing water is reduced to let the water fall.

Since the outlet of the small passage 27 is set such as to be narrowed as much as possible as mentioned above, this makes exiting of water of which momentum is reduced after infiltrating into the dead end 35a unlikely. Even if water exits from the outlet of the small passage 27, the water falls such as to stream down the inner face 17b of the side wall 17 to be discharged from a not-shown drain outlet of the lower cover 16.

Figure 12A:
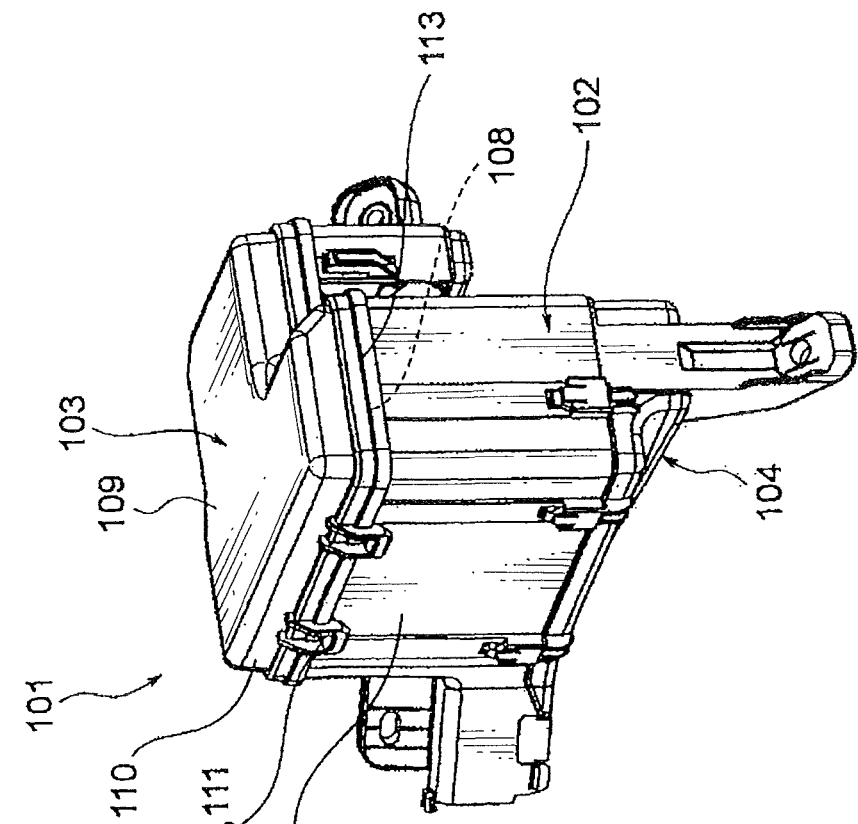
FIG. 12A is a perspective view of the waterproof box during an upper cover rotating, in a reference example for explaining infiltrating of water when no dead end.
Figure 12B:
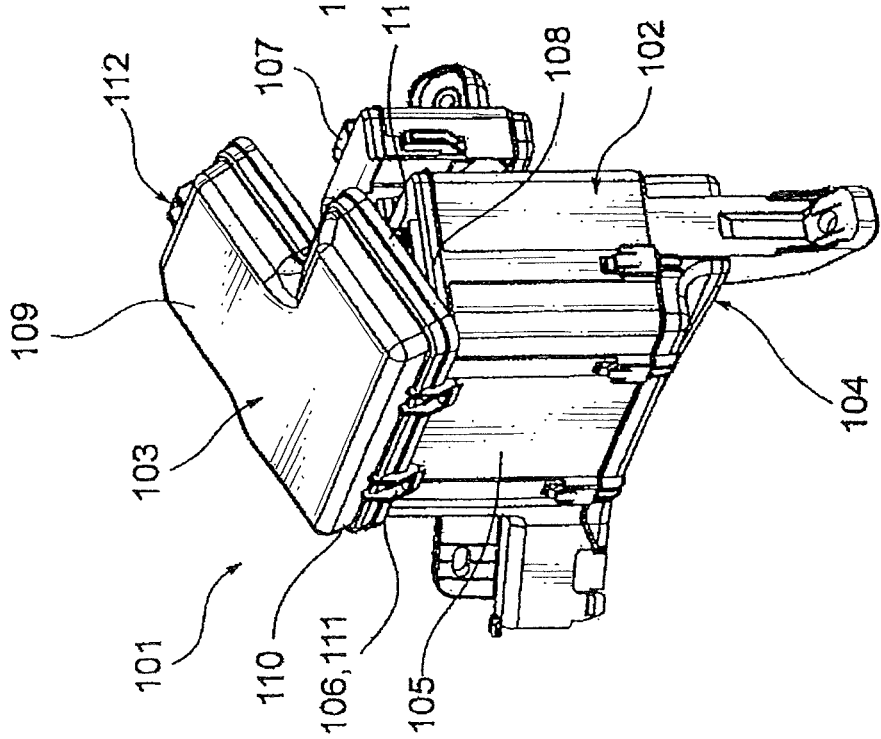
FIG. 12B is a perspective view illustrating the waterproof box with the upper cover locked, in a reference example for explaining infiltrating of water when no dead end.
Figure 13A:
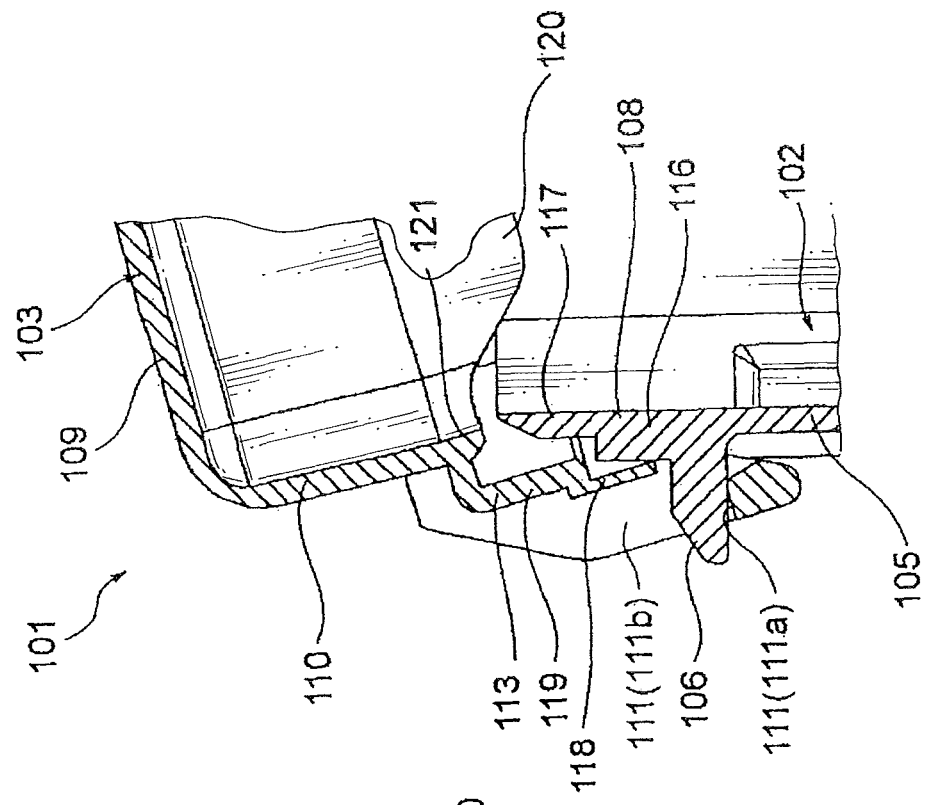
FIG. 13A is a cross-sectional view illustrating the waterproof box during the upper cover rotating, in a reference example for explaining infiltrating of water when no dead end.
Figure 13B:
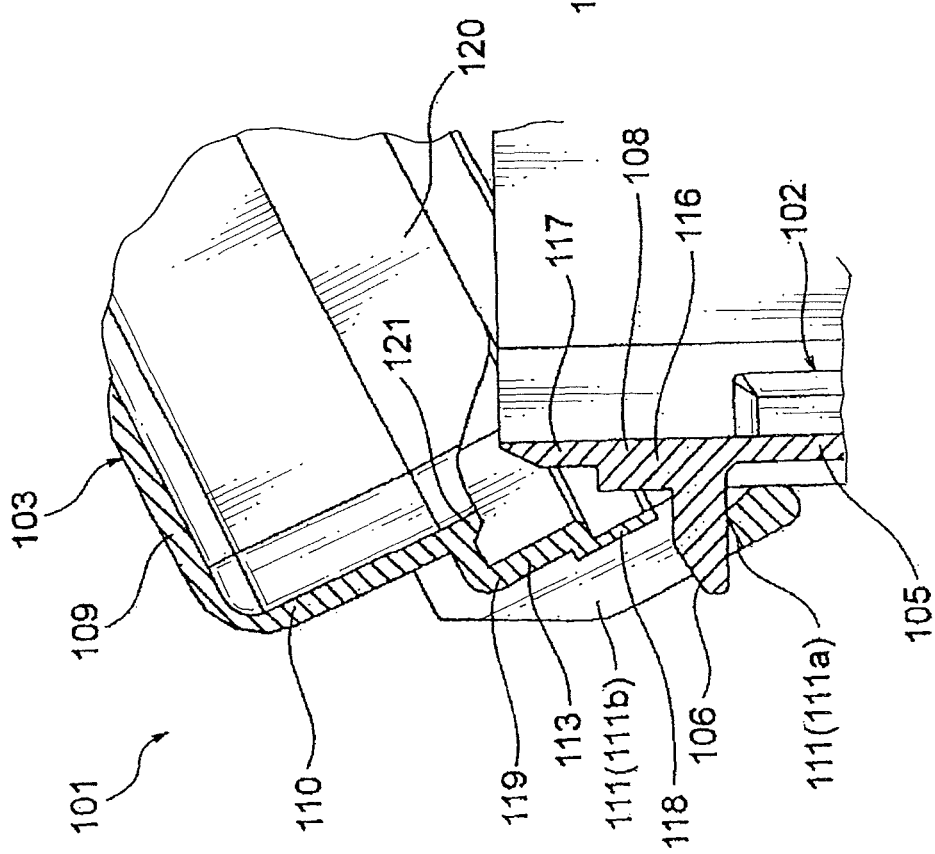
FIG. 13B is a cross-sectional view illustrating the waterproof box during the upper cover rotating, in a reference example for explaining infiltrating of water when no dead end.
Figure 14A:
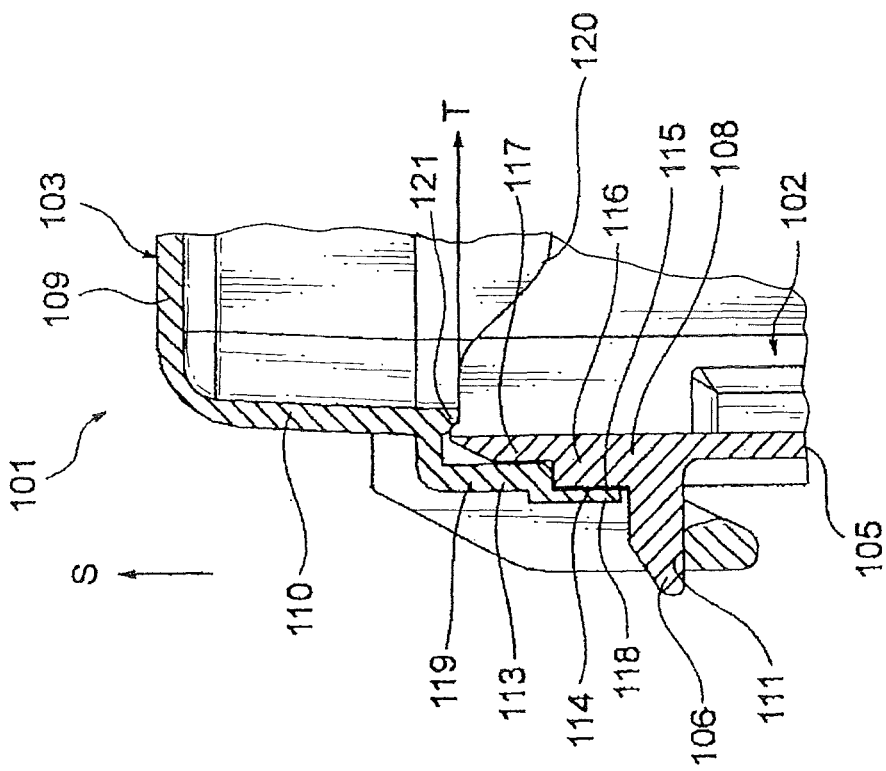
FIG. 14A is a cross-sectional view illustrating the waterproof box during the upper cover rotating, in a reference example for explaining infiltrating of water when no dead end.

Now, infiltrating of water without such a dead end 35a is explained with reference to FIGS. 12 to 14. It should be noted that waterproof structure in FIGS. 12 to 14 is a reference example corresponding to the above embodiment, and is configured so that the momentum of infiltrating water toughens more than that in the main body waterproof structure 20 and the cover waterproof structure 26. Hereafter, the reference example is explained.

<Reference Example of Infiltrating of Water without Such a Dead End 35a>

In FIG. 12, a waterproof box 101 is configured to include a box main body 102, an upper cover 103 covering an upper opening of the box main body 102, and a lower cover 104 engaging with a lower end of the box main body 102.

The box main body 102 has a side wall 105. The side wall 105 is provided with a pivot point 106 for making the upper cover 103 relative and detachable. Further, the side wall 105 is provided with a main body lock 107 for locking the upper cover 103. An upper end of the side wall 105 is circumferentially provided with a main body waterproof 108 as a part for waterproofing.

The upper cover 102 is configure to make the upper cover 103 relative about the pivot point 106 as well as to make the main body lock 107 lock the upper cover 103 to be a locking state. Further, unlocking the above-mentioned locking state and rotate in such a manner as to bring up the upper cover 10 at this time of unlocking is arranged to replace the upper cover 103 easily.

The upper cover 103 is a cover member formed to fit a shape of the box main body 102, which has a ceiling wall 109 and a cover side wall 110 extending downward from a side edge of the ceiling wall 110. The side wall 110 is provided with a pivot point 111 to be a rotation center of the upper cover 103 along with the pivot point 106 of the box main body 102. Further, the cover side wall 110 is provided with a cover lock 112 hooked and locked to the main body lock 107 of the box main body 102. A lower end of the cover side wall 110 is circumferentially provided with a cover waterproof structure 113 as a part for waterproofing.

In FIGS. 13 and 14, rotating the upper cover 103 relative to the box main body 102 to make these in the locking state allows the main body waterproof structure 108 and the cover waterproof structure 113 to be overlaid.

In the main body waterproof structure 108 a main body mating face 114 is formed. A cover mating face 115 is formed in the cover waterproof structure 113. The main body mating face 114 and the cover mating face 115 are arranged to oppose to each other by above-mentioned overlaying.

The main body waterproof structure 108 has a first waterproof part 116 and a second waterproof part 117. The first waterproof 116 is located under the first waterproof part 116. The pivot point 116 is projection-shaped, and formed to project outward.

The cover waterproof structure has a first waterproof part 118 and a second waterproof part 119. The first waterproof part is disposed to correspond to the first waterproof 116 of the main body waterproof structure 108, the second waterproof 119 the second waterproof part 117 of the main body waterproof structure 119.

The pivot point 111 has a through bore 111a enabling the projection-shaped pivot support point 106 in the main body waterproof structure 108 to insert therein, and a pair of protect walls 111 located at opposite sides of the through bore 111a. The pair of protect walls 111b is rib-shaped, and formed such as to extend vertically.

The first waterproof parts 116 and 117, the second waterproof parts 117 and 119 in the main body waterproof structure 108 or the cover waterproof structure 113 is formed to induce labyrinth, viewing in cross-section.

The upper cover 103 has an inner wall 120 extending so as to oppose an inner face of the side wall 105 in the box main body 102. The inner wall 120 is disposed so as to connect to a lower end of the cover side wall 110. The inner wall 120 is disposed on except a wall on which pivot point 111 to be a rotation center of the upper cover 103 exists. A wall on which the pivot point 111 exists is provided with a tapered part 121 so that its tip is located below an outlet of a small passage (not shown), (the tapered part is alternatively provided because providing the inner wall 120 on a wall on which the pivot point 111 exists limits rotation of the upper cover 103.)

Figure 14B:
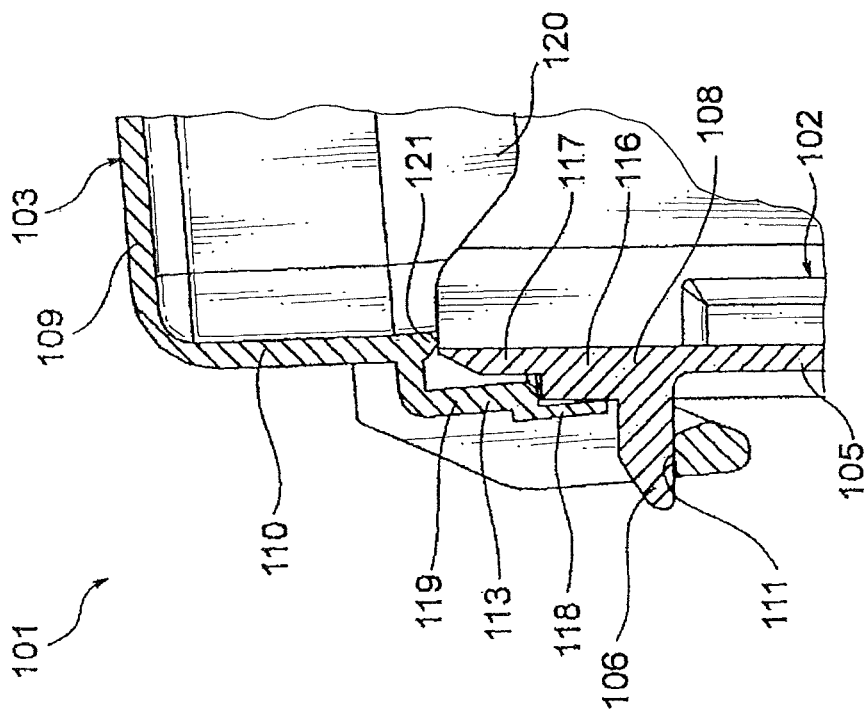
FIG. 14B is a cross-sectional view illustrating the waterproof box with the upper cover locked, in a reference example for explaining infiltrating of water when no dead end.

In the above configure and structure, while having the upper cover 103 with one hand, inserting the pivot point 111 of the upper cover 103 into the pivot point 106 of the box main body 102, and rotating the upper cover 103 about the pivot points 106 and 111, the cover lock 112 of the upper cover 103 is hooked to the main body lock 107 of the box main body 102 to be locked (forming a lock state). When an upper opening of the box main body 102 is covered with the upper cover 103, the main body waterproof structure 108 and the cover waterproof structure 113 are overlaid, completing such a waterproof structure form as shown in FIG. 14B. The main body waterproof structure 108 and the cover waterproof structure 113 let the main body mating face 114 and cover mating face 115 mate to each other by above-mentioned overlaying.

When high-pressure washing, washing water injecting toward the waterproof box 101 hits the side wall 105 of the main box body 102, and then ascends along the side wall 105. The washing water having ascended along the side wall 105 lets the upper cover 103 move in a direction of the arrow S to induce uplift, and infiltrates (passes through) into the gap between the first waterproof part 116 and 118 and a gap between the second waterproof part 117 and 119. When running to the outlet of the small passage (not shown), water flies off toward the arrow T direction from the outlet.

As mentioned above, it is understood, as explaining the invention with refer to FIGS. 1 to 11, or as explaining the reference example with refer to FIGS. 12 to 14, that the present invention successfully works on enhancing the waterproof performance more than conventional one. Furthermore, detaching by one action with one hand of the upper cover 15 successfully works on contributing workability and space-saving.

It is to be understood that such changes and modifications will be apparent to be implemented within the spirit of the invention.

REFERENCE SIGNS LIST 1 electric wire junction box
7 automobile
8 engine compartment
9 engine
10 battery
11 waterproof box
12 functional component
13 box main body
15 upper cover (cover)
16 lower cover
17 side wall
18 pivot point
19 main body lock
20 main body waterproof structure
21 engagement part
22 ceiling wall
23 cover side wall
24 pivot point
25 cover lock
26 cover waterproof structure
27 small passage
28 main body mating face
29 cover mating face
30,33 first waterproof part
31,34 second waterproof part
32,34 third waterproof part
36,37 outlet reference
38 inner wall
39 tapered part

The invention claimed is:
1. A waterproof box comprising:
a box main body having a side wall and accommodating a component in the side wall which provides a waterproof structure;
a cover having a cover side wall and covering an opening defined by a side wall edge of the box main body;
a main body waterproof structure disposed at the side wall edge;
a cover waterproof structure disposed at an edge of the cover side wall, the cover waterproof structure securing waterproof by overlaying the main body waterproof structure thereon;
pivot points for making the cover rotative and detachable relative to the box main body disposed in the main body waterproof structure and the cover waterproof structure, respectively; and
a plurality of dead ends each disposed at different heights on a wall in which the pivot point of the cover side wall exists,
wherein one of the plurality of dead ends is disposed on a main body mating face of the main body waterproof structure and a cover mating face of the cover waterproof structure which both the mating faces oppose to each other by the overlaying, and at an outlet of a small passage induced by a clearance between the main body mating face and the cover mating face, and is formed into a space with a desired size.

2. The waterproof box as claimed in claim 1, further comprising an inner wall disposed inner than the side wall of the box main body, wherein a tip of the inner wall is disposed to project nearer a base end of the cover side wall than the outlet of the small passage provided with one of the plurality of dead ends.

3. The waterproof box as claimed in claim 2, wherein the inner wall is formed integral with a cavity of the component accommodated in the box main body.

4. The waterproof box as claimed in claim 1, wherein one of the plurality of dead ends is provided with a convex portion projecting from an inner face of the dead end toward an outer face of the dead end so as to correspond to a position of the outlet of the small passage.

5. The waterproof box as claimed in claim 2, wherein one of the plurality of dead ends is provided with a convex portion projecting from an inner face of the dead end toward an outer face of the dead end to correspond to a position of the outlet of the small passage.

6. The waterproof box as claimed in claim 3, wherein one of the plurality of dead ends is provided with a convex portion projecting from an inner face of the dead end toward an outer face of the dead end to correspond to a position of the outlet of the small passage.

7. The waterproof box as claimed in claim 1, wherein an outlet reference to one of the plurality of dead ends in a position of the outlet of the small passage and an outlet reference to the box main body is set on the same plane along a extending direction of the side wall, or the outlet reference to one of the plurality of dead ends is also set outer the box main body than the outlet reference to the box main body.

8. The waterproof box as claimed in claim 2, wherein an outlet reference to one of the plurality of dead ends in a position of the outlet of the small passage and an outlet reference to the box main body is set on the same plane along a extending direction of the side wall, or the outlet reference to one of the plurality of dead ends is also set outer the box main body than the outlet reference to the box main body.

9. The waterproof box as claimed in claim 3, wherein an outlet reference to one of the plurality of dead ends in a position of the outlet of the small passage and an outlet reference to the box main body is set on the same plane along a extending direction of the side wall, or the outlet reference to one of the plurality of dead ends is also set outer the box main body than the outlet reference to the box main body.

10. The waterproof box as claimed in claim 4, wherein an outlet reference to one of the plurality of dead ends in a position of the outlet of the small passage and an outlet reference to the box main body is set on the same plane along a extending direction of the side wall, or the outlet reference to one of the plurality of dead ends is also set outer the box main body than the outlet reference to the box main body.

11. The waterproof box as claimed in claim 5, wherein an outlet reference to one of the plurality of dead ends in a position of the outlet of the small passage and an outlet reference to the box main body is set on the same plane along a extending direction of the side wall, or the outlet reference to one of the plurality of dead ends is also set outer the box main body than the outlet reference to the box main body.

12. The waterproof box as claimed in claim 6, wherein an outlet reference to one of the plurality of dead ends in a position of the outlet of the small passage and an outlet reference to the box main body is set on the same plane along a extending direction of the side wall, or the outlet reference to one of the plurality of dead ends is also set outer the box main body than the outlet reference to the box main body.

* * * * *